US007895323B2

United States Patent
Gupta et al.

(10) Patent No.: US 7,895,323 B2
(45) Date of Patent: Feb. 22, 2011

(54) HYBRID EVENT PREDICTION AND SYSTEM CONTROL

(75) Inventors: Manish Gupta, Yorktown Heights, NY (US); Jose E. Moreira, Yorktown Heights, NY (US); Adam J. Oliner, Cheshire, CT (US); Ramendra K. Sahoo, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 12/267,762

(22) Filed: Nov. 10, 2008

(65) Prior Publication Data

US 2009/0070628 A1    Mar. 12, 2009

Related U.S. Application Data

(63) Continuation of application No. 10/720,300, filed on Nov. 24, 2003, now Pat. No. 7,451,210.

(51) Int. Cl.
*G06F 15/173* (2006.01)
(52) U.S. Cl. .................. 709/224; 709/223; 709/226; 714/26; 706/15; 706/21; 706/25; 706/908; 706/916
(58) Field of Classification Search .......... 709/223, 709/224, 226; 714/26; 706/21, 25, 908, 706/916
See application file for complete search history.

(56) References Cited

U.S. PATENT DOCUMENTS

| | | | | |
|---|---|---|---|---|
| 5,031,089 A | * | 7/1991 | Liu et al. | 709/226 |
| 5,974,237 A | * | 10/1999 | Shurmer et al. | 709/224 |
| 6,076,083 A | * | 6/2000 | Baker | 706/52 |
| 6,446,123 B1 | * | 9/2002 | Ballantine et al. | 709/224 |
| 6,738,811 B1 | * | 5/2004 | Liang | 709/224 |
| 6,862,623 B1 | * | 3/2005 | Odhner et al. | 709/226 |
| 7,007,084 B1 | * | 2/2006 | Chakravarti et al. | 709/224 |
| 7,225,250 B1 | * | 5/2007 | Harrop | 709/224 |
| 2002/0019870 A1 | * | 2/2002 | Chirashnya et al. | 709/224 |
| 2002/0174217 A1 | * | 11/2002 | Anderson | 709/224 |
| 2003/0023719 A1 | * | 1/2003 | Castelli et al. | 709/224 |
| 2006/0277299 A1 | * | 12/2006 | Baekelmans et al. | 709/224 |

OTHER PUBLICATIONS

Peter J. Brockwell, and Richard A.Davis, Introduction to Time Series Forecasting, 2002, Springer 2nd, pp. 1-44.*

* cited by examiner

*Primary Examiner*—John Follansbee
*Assistant Examiner*—Anthony Mejia
(74) *Attorney, Agent, or Firm*—Michael J. Buchenhorner; Derek S. Jennings

(57) ABSTRACT

A system for predicting an occurrence of a critical even in a computer cluster includes: a control system that includes an event log, a system parameter log, a memory for storing information related to occurrences of critical events, and a processor. The processor implements a hybrid prediction system; loads the information from the event log and the system performance log into a Bayesian network model; uses the Bayesian network model to predict a future critical event; makes future scheduling and current data migration selections; and adapts the Bayesian network model by feeding the scheduling and data migration selections.

18 Claims, 3 Drawing Sheets

HYBRID EVENT PREDICTION AND SYSTEM CONTROL

CROSS-REFERENCE TO RELATED APPLICATIONS

This application is a continuation of co-pending, commonly-owned U.S. patent application Ser. No. 10/720,300, filed on Nov. 24, 2003 which is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The present invention is generally directed towards a control system for a computer cluster. More particularly, the present invention is directed toward a hybrid apparatus for predicting the system performance of, and the occurrence of critical events in, a computer cluster formed from a series of nodes.

BACKGROUND OF THE INVENTION

Networks or clusters of computers are used for all types of applications in the modern world. In order for these clusters of computers to function efficiently and effectively, it is important that the individual computers that make up the cluster function properly. If any individual computer in the cluster unexpectedly fails, the effect on the cluster can be catastrophic and cascading. Once an error in the cluster has been detected, it is often possible to take corrective measures to minimize the harm to the overall functioning of the cluster. However, given the speed of modern business and the importance of certain computer clusters, even small amounts of down time can prove extremely costly. Therefore, it would be very advantageous to be able to predict errors or system failures and take corrective action prior to their occurrence.

Several techniques have been previously proposed in the literature for using proactive system management to improve the performance of computer clusters. Some of these techniques have included attempts to predict the occurrence of failures and the use of software rejuvenation. Successful prediction of errors in a computer system in particular offers the promise of enabling significantly improved system management. However, prior techniques for predicting errors have been unreliable and have had several other deficiencies that have prevented them from being widely accepted.

Therefore, what is needed is an improved method of predicting the occurrence or errors in a computer cluster and transforming the system to minimize the impact of the predicted errors.

SUMMARY OF THE INVENTION

Briefly, we describe an occurrence of critical events in a computer cluster having a series of nodes. A system according to an embodiment of the invention maintains an event log that contains information concerning critical events that have occurred in the computer cluster is maintained. A system parameter log that contains information concerning system status for each node in the cluster is also maintained. The system parameter log preferably includes at least few environmental parameters like node temperature, a utilization parameter of a central processing unit of a node in the cluster and a corresponding time value. The event log and the system parameter log are filtered such that some redundant critical event information and system parameter information is not maintained in the event log and the system parameter log. A Bayesian network model that represents the computer cluster and the nodes is developed based upon the information in the event log and the system parameter log. In accordance with the Bayesian Network, a time-series mathematical model is used to predict future values of the system parameters. A rule based classification system is then used to predict the occurrence future critical events. A warning window is formed for each node in the cluster such that the warning window contains a predicted performance parameter or critical event occurrence for the node for a predetermined future period of time. Thus, the future performance of a node in the cluster is predicted based upon the information in the event log and the system parameter log.

Another application of the present invention is directed towards a system for improving the performance of a computer cluster having a series of nodes. In accordance with an embodiment of the invention, the occurrence of critical events in the nodes in the computer cluster is monitored. The system performance parameters of the nodes in the computer cluster are also monitored. Information concerning the critical events and the system performance parameters is saved in a database. The system performance parameters concern at least one of the node temperature, processor utilization value, network bandwidth and available memory space. The saved information is filtered to remove information that is not determined to be useful in predicting the future performance of the nodes. A time-series mathematical model is applied to the system performance parameters to predict future values of the system performance parameters. The time series mathematical model is preferably one of an auto regression, a moving average and an autoregressive moving average model. Rule based classifications are used to associate some of the system performance parameters with the occurrence of the critical events. A node representation is created for each node in the computer cluster based upon the monitoring and a cluster representation is created based upon the node representations. The node representations are periodically examined to predict future node performance and the cluster representation is used to redistribute tasks among the nodes based upon the predicted node performance. The cluster representation and the node representation form a Bayesian Network that represents relationships between the occurrence of the critical events and the system performance parameters.

Yet another application of the present invention is directed toward an information processing system that includes a computer cluster having a series of nodes. A control system monitors critical events that occur in the computer cluster and the system parameters of the nodes. A memory stores information related to the occurrence of the critical events and the system parameters of the nodes. A filter removes redundant information from the stored information to reduce storage requirements of the system. A dynamic probe generator determines when to collect additional information concerning the system parameters or the critical event occurrence based upon the operation of the system. The information processing system has a Bayesian Network model that predicts a future occurrence of a critical event based upon an observed relationship between the system parameters and the occurrence of critical events. The Bayesian Network model includes a time-series modeler for predicting future values of the system parameters and a rule based classification system for associating the system parameters with the occurrences of the critical events.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
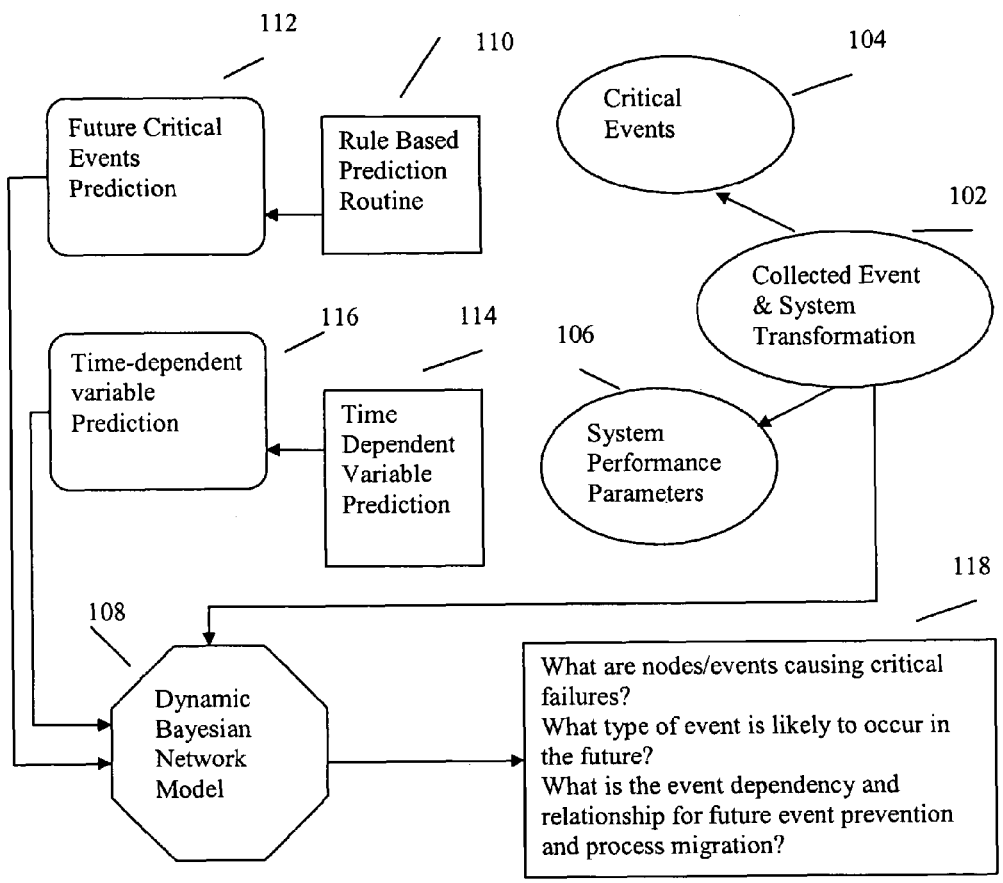
FIG. 1 is a flowchart of a method in accordance with an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We discuss an apparatus for predicting error occurrences in a computer cluster that includes a series of nodes. In such a cluster system, prediction of a specific node's failure can be used to steer jobs away from the potentially failing node. This can be done prior to launching a job by avoiding the error prone node when scheduling the job, or after launching a job by migrating the running job to a healthier node. Such predictions can also help schedule system maintenance at appropriate times to avoid unplanned outages. Even if the prediction of an error happens too late to allow proactive action, the same analysis can serve as a foundation for more effective error isolation (e.g., identifying the node that led to an error, given an avalanche of errors subsequently observed in a cluster).

Referring now to FIG. 1, a flow chart illustrating an information processing method 100 according to a preferred embodiment of the invention is shown. The information processing method 100 is based upon the collection of event information and the transformation of the system based upon the collected information as shown in step 102. The collected information concerns critical events 104 that occur in the system and system performance parameters 106 that relate to the conditions under which the system is operating. More particularly, the system performance parameters 106 relate to system state variables such as temperature, central processing unit utilization, time, processor number, user time, idle time, input/output time, etc. These system state performance parameters 106 relate to the performance of the system and do not typically represent unexpected events. Thus, the system state parameters 106 are preferably recorded at predetermined intervals of time. The length of the interval depends upon the nature of the parameters 106 being recorded.

Conversely, critical events 104 are events that represent failures of the system based on various hardware or software errors or node failures that are typically unexpected and detrimentally affect the systems performance. Thus, the critical events 104 are preferably recorded when they occur along with the approximate time of occurrence and the node or location at which they occurred. In addition, the occurrence of a critical event 104 can prompt the system to record addition system performance parameters 106 that may have led to the critical event 104.

The critical events 104 and the system performance parameters 106 are fed into a dynamic Bayesian Network Model 108. Bayesian networks are complex diagrams that organize a body of knowledge in any given area by mapping out cause-and-effect relationships among key variables and encoding them with numbers that represent the extent to which one variable is likely to affect another. The Bayesian Network Model 108 of the embodiment of FIG. 1 uses rule based prediction criteria 110 to predict future critical events 112 that occur when certain conditions are present and time-dependent variable prediction criteria 114 to make predictions 116 concerning time-dependent variables that occur at predictable intervals of time. By combining these methods of analysis, an improved hybrid prediction system 100 for large clusters of computers is achieved.

The Dynamic Bayesian Network 108 applies the decision criteria 110 and 114 to the logged information 104 and 106 to predict future critical events 112 and values for time-dependent variables 116. These predictions 112 and 116 are used to provide valuable information 118 concerning the computer cluster and its nodes' present and future performance. This information 118 includes the nodes and/or events that are causing critical events 104, the type of critical events 104 likely to occur in the future and the dependency between critical events 104 and system performance parameters 106. This information 118 is then used for event prevention and system transformation 102. System transformation 102 involves job scheduling and process migration away from troublesome nodes or times. The information 118 can also be used to determine what seemingly benign events occurring in the computer cluster are actually causing subsequent critical error events 104.

The prediction system represented in steps 112 and 116 preferably begins in a tabular state. That is the predictive models 112 and 116 are not built based on any assumptions about the conditions under which errors will occur or the behavior of the independent variables of the cluster. Over time, the system 100 learns the error and event patterns and is able to flag nodes that have a high probability of failing or experiencing the occurrence of a critical event and the times at which any critical events are likely to occur. Thus, the system 100 predicts failures in an adaptive manner that depends upon the past performance of the cluster. This aspect of the invention makes it useful with a wide variety of types of clusters having unknown operating parameters and failure rates.

Figure 2:
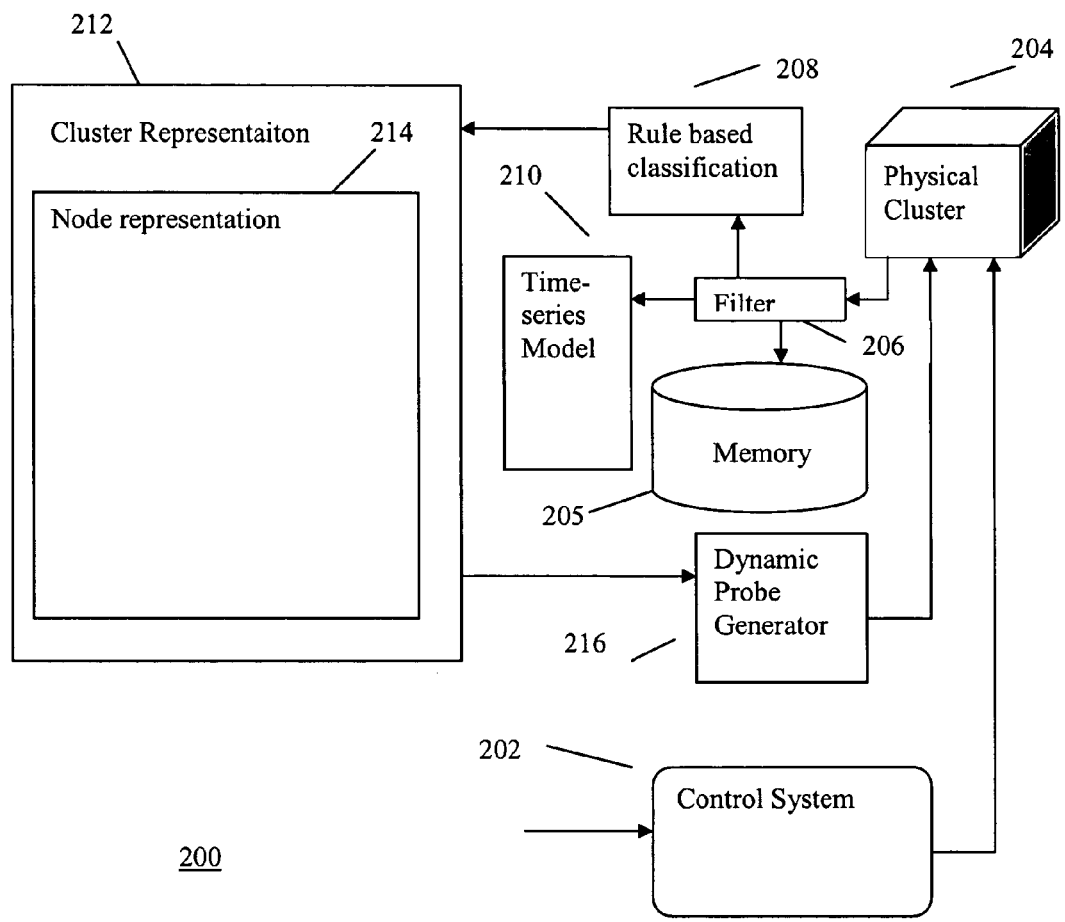
FIG. 2 is a high level block diagram showing an information processing system in accordance with another embodiment of the present invention.

Referring now to FIG. 2, there is shown a block diagram of an information handling system 200 according to an embodiment of the invention. The system 200 is managed by a control system 202 that preferably comprises a processor, a memory, and an input/output (I/O) subsystem.

The control system 202 monitors a physical cluster 204 of computers or nodes that are arranged into a network. The control system 202 gathers information concerning time-dependent properties and system performance properties of the physical cluster 204 as well as the occurrence of any critical events. This information is fed through a filter 206 that aligns the events and eliminates any redundant events or information. The filter 206 also categorizes the events as time-dependent or time-independent as well as either derived or primary variables and evaluates the information according to a set of evaluation criteria to determine what information needs to be logged as relevant and what information may be discarded as irrelevant.

Primary variables represent raw data measurements from the system while derived variables are calculated or computed based upon the primary variables. Time-dependent variables include among other things processor utilization, network bandwidth and computer chip temperature. Examples of time-independent variables include network topology, disk size, number of processors and memory size. The filtered information from the filter 206 is stored in a central measurement database 205.

The time-independent filtered information also passes from the filter 206 to a rules based classification routine 208 that develops a set of rules based upon detected relationships between the time-independent information and the occurrence of critical events. These rules associate a number of events that signal a potential critical event with the critical event which they tend to predict. The critical events are assigned a severity value that reflects the relative importance of the critical event with respect to the clusters 204 performance and the associated events are assigned a value that indicates their correlation with a critical event. These rules are used to develop a cluster representation 212 and a node representation 214.

The time-dependent information is passed to a time series modeling routine 210 that develops mathematical algorithms through the use of linear time-series and/or wavelet techniques that can be used to predict the future values of the time-dependent variables. The time series mathematical models are preferably an auto regression, a moving average or an autoregressive moving average model. However, it will be readily appreciated by one skilled in the art that a wide variety of mathematical modeling techniques could be used. These algorithms are then used to further improve the created cluster 212 and node representations 214. While the time-series modeling routine 210 is feeding the cluster representation 212 predicted future states, the cluster representation 212 is making predictions about what errors or other critical events should be expected at some future time and the nodes at which they are expected. The confidence level of these predictions is inherently present in the cluster representation 212. The node representations 214 which are predicting that a severe error is likely to occur in their associated nodes can be flagged as potential problems. The control system 202 for the cluster 204 is notified so that it may make scheduling and data migration choices appropriately. As a result of the actions of the control system 202, the system itself will output more information to data filtering mechanism 206, thus feeding the process and completing the cycle.

For each node in the physical cluster 204, where a node is the smallest set of components for which the system differentiates, a static Bayesian Network is maintained. This Bayesian Network is referred to as the node representation 214. The set of node representations 214 forms the cluster representation 216. The error or event stream output from the data filter 206 is used as training data for the node in which the event occurred. A node representation 214 is preferably only maintained for those nodes in the physical cluster 204 in which at least one error has occurred. Since nodes of the system will often be error-free, save for a few problem nodes, only maintaining node representations 214 for error prone nodes greatly reduces the processing power and memory required to implement the system.

As previously discussed above, the system 200 preferably reports information falling into two categories. Events constitute the first category of information. These events are generally stored in the form of event logs. The second category of information involves the operating states of the system. This second category includes such information as the variable environmental conditions of a node (e.g. temperature), the amount of utilization of a CPU, the current time, and so forth.

The amount of this information that is reported by a cluster may be enormous. Fortunately, there tends to be a great deal of redundancy in the information. Thus, a script based filtering mechanism such as filter 206 is preferably used to parse this information to make it more easily manageable and decrease the processing and data storage requirements of the system. Such a filter 206 eliminates the redundant information, and associates events with the state of the system at the time of the error. This error/state association information forms a stream of error and event information that is used to monitor the present performance of the system and predicts its future performance. The output information output by the script filtering mechanism 206 is preferably stored in a central database 205.

Once the cluster representation 212 and the node representations 214 are computed along with the associated probabilities that a critical event will occur at a particular node within a particular time window, a policy for handling the critical event based upon the type of critical event and the likelihood of its occurrence can be formulated. As will be appreciated by those skilled in the art, the type of critical event predicted to occur will determine the corrective action that will be dictated by the policy. The corrective action may include migrating an ongoing process to a different node or rerouting an upcoming action through a different node or path. In addition, actions may be rescheduled to occur at a time which the cluster 212 and node representations 214 indicate a critical event is less likely to occur.

If the information gathered through the logging of events and system performance parameters is not sufficient to base a decision upon, a dynamic probe generator 216 will probe the physical cluster 204 for additional information related to the desired properties of the cluster 204. These probes can be directed toward collecting additional information from past records or future sets of events. Thus, the use of a dynamic probe generator 216 further decreases the data storage requirements of the central measurement data base 205.

Figure 3:
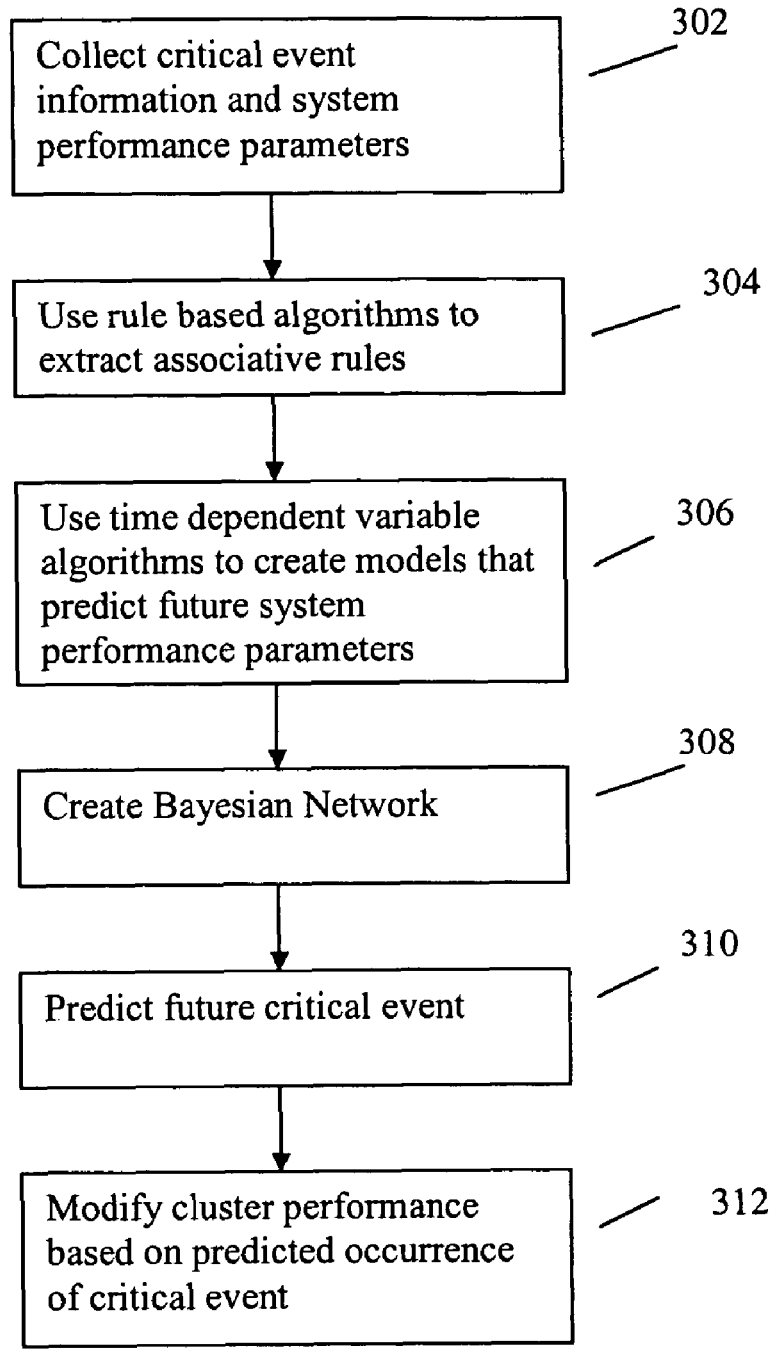
FIG. 3 is a flow chart illustrating another method in accordance with an embodiment of the present invention.

Referring now to FIG. 3, a flow chart of a method 300 for predicting the occurrence of critical events in a computer cluster in accordance with an embodiment of the present invention is shown. The method begins in step 302 with the collecting of event information and system performance parameters. The event information preferably concerns the occurrence of critical events that adversely affect the performance of the cluster or one of its nodes and the system performance parameters preferably bear some relationship to the potential occurrence of such a critical event.

The method then proceeds to step 304 wherein rule-based algorithms are used to establish and extract associative rules for predicting the probable occurrence of critical events within a specified time window or time limit and the variables that are likely to indicate the potential occurrence of such an event.

In step 306, time-dependent variable algorithms such as linear time-series and wavelets are used to create models that predict future values of the system performance parameters. A static or dynamic Bayesian Network is then created that represents the determined interaction and relationship between the system performance parameters and the occurrence of critical events in step 308.

In step 310, the occurrence of future critical events within a specified time-limit is predicted by associating the critical event with other events that tend to precede the critical event. Finally, in step 312, the cluster's performance is modified based upon a predicted occurrence of a critical event.

What has been shown and discussed is a highly simplified depiction of a programmable computer apparatus. Those skilled in the art will appreciate that other low-level components and connections are required in any practical application of such a computer apparatus. Therefore, while there has been described what is considered to be the preferred embodiment, it will be understood by those skilled in the art that other modifications can be made within the spirit of the invention.

We claim:

1. An information processing system for predicting an occurrence of a critical event in a computer cluster, the information processing system comprising:
   the computer cluster comprising a series of nodes;
   a control system comprising:
   A) an event log comprising information concerning critical events that occur in the computer cluster, wherein said critical events adversely affect performance of the cluster or one of its nodes;
   B) a system parameter log comprising information concerning system performance parameters for each node in the cluster;
   C) a processor configured for:
      i) implementing a hybrid prediction system comprising rule based prediction algorithms, time-dependent variable prediction algorithms, and a warning window;
      ii) maintaining the event log for only those nodes in which an error has occurred;
      iii) maintaining the system parameter log for each node in the cluster;
      iv) for only those nodes in which an error has occurred, loading the information from the event log and the system performance information pertaining to said error-prone nodes from the system parameter log into a Bayesian network model representing a correspondence between the system performance parameters and occurrence of the critical events;
      v) using the Bayesian network model to predict a future critical event within a specified time-limit based upon the hybrid prediction system;
      vi) making future scheduling and current data migration selections based upon the hybrid prediction system; and
      vii) adapting the Bayesian Network Model by feeding the scheduling and data migration selections into said Bayesian Network Model; and
   D) a memory for storing information related to said occurrence of said critical events and said system parameters of said nodes.

2. The information processing system of claim 1 further comprising E) a filter for filtering the event log and the system parameter log such that some critical event information and some system parameter information is eliminated in order to reduce storage requirements of the cluster.

3. The information processing system of claim 1 wherein said Bayesian Network comprises a time-series modeler for predicting future values of said system parameters.

4. The information processing system of claim 1 wherein said Bayesian Network comprises a rule based classification system for associating said system parameters with said occurrences of said critical events.

5. The information processing system of claim 1 further comprising:
   F) a dynamic probe generator for determining when to collect additional information concerning said system parameters or said critical event occurrence.

6. The information processing system of claim 1 wherein the processor is further configured for maintaining the event log, comprising:
   aligning the information concerning the critical events; and
   categorizing the information concerning the critical events according to time-dependency.

7. The information processing system of claim 1 wherein the processor is further configured for maintaining the system parameter log, comprising:
   recording a temperature of the nodes in the cluster and a corresponding time value; and
   recording a utilization parameter of a central processing unit of a node in the cluster and a corresponding time value.

8. The information processing system of claim 1 wherein the rule-based prediction algorithms use associative rules based upon the critical event information and the system parameter information for predicting a probable occurrence of the critical events within a specified time window and the variables that are likely to indicate a potential occurrence of such an event.

9. The information processing system of claim 1 wherein the time-dependent variable prediction algorithms generate time-series mathematical models that predict future values of the system performance parameters.

10. The information processing system of claim 9 wherein the warning window is formed for only those nodes in the cluster in which at least one error has occurred in order to reduce system requirements, wherein said warning window comprises a predicted performance parameter or critical event occurrence for the node for a predetermined future period of time.

11. The information processing system of claim 1 further comprising an input output subsystem.

12. A non-transitory computer readable storage medium comprising program instructions that predicts an occurrence of a critical event in a computer cluster by:
   implementing a hybrid prediction system comprising rule based prediction algorithms, time-dependent variable prediction algorithms, and a warning window for a computer cluster comprising a series of nodes, said hybrid prediction system carrying out instructions for:
   maintaining an event log for only those nodes in which an error has occurred, wherein the error adversely affects performance of the cluster or one of its nodes;
   maintaining a system parameter log for each node in the computer cluster;
   for only those nodes in which an error has occurred, loading the information from the event log into a Bayesian network model representing a correspondence between the system performance parameters and occurrence of the critical events;
   for only those nodes in which an error has occurred, loading system performance information pertaining to said error-prone nodes from a system parameter log comprising information concerning system performance parameters for each node in the cluster into the Bayesian network model;
   using the Bayesian network model to predict a future critical event within a specified time-limit based upon the hybrid prediction system;

storing information related to said occurrence of said critical events and said system parameters of said nodes;

making future scheduling and current data migration selections based upon the hybrid prediction system; and adapting the Bayesian Network Model by feeding the scheduling and data migration selections into said Bayesian Network Model.

13. The non-transitory computer readable storage medium of claim 12 wherein the instructions further comprise:

filtering the event log and the system parameter log such that some critical event information and some system parameter information is eliminated in order to reduce storage requirements of the cluster.

14. The non-transitory computer readable storage medium of claim 12 wherein the instructions further comprise using a dynamic probe generator for determining when to collect additional information concerning said system parameters or said critical event occurrence.

15. The non-transitory computer readable storage medium of claim 12 wherein the instructions further maintain the event log, comprising steps of:

aligning the information concerning the critical events; and categorizing the information concerning the critical events according to time-dependency.

16. The non-transitory computer readable storage medium of claim 12 wherein the instructions further maintain the system parameter log, comprising steps of:

recording a temperature of the nodes in the cluster and a corresponding time value; and recording a utilization parameter of a central processing unit of a node in the cluster and a corresponding time value.

17. The non-transitory computer readable storage medium of claim 12 wherein the warning window is formed for only those nodes in the cluster in which at least one error has occurred in order to reduce system requirements, wherein said warning window comprises a predicted performance parameter or critical event occurrence for the node for a predetermined future period of time.

18. The non-transitory computer readable storage medium of claim 12 further comprising an input output subsystem.

* * * * *